(12) United States Patent
Weill et al.

(10) Patent No.: US 6,370,207 B1
(45) Date of Patent: Apr. 9, 2002

(54) METHOD FOR MITIGATING MULTIPATH EFFECTS IN RADIO SYSTEMS

(75) Inventors: Lawrence Weill, Seal Beach; Benjamin Fisher, Anaheim Hills, both of CA (US)

(73) Assignee: Comm Sciences Corporation, Orange, CA (US)

( * ) Notice: Subject to any disclaimer, the term of this patent is extended or adjusted under 35 U.S.C. 154(b) by 0 days.

(21) Appl. No.: 09/472,638

(22) Filed: Dec. 27, 1999

Related U.S. Application Data

(63) Continuation of application No. 08/934,493, filed on Sep. 19, 1997, now Pat. No. 6,031,881.
(60) Provisional application No. 60/026,318, filed on Sep. 19, 1996.

(51) Int. Cl.$^7$ .............................. H03D 1/00; H04L 27/06
(52) U.S. Cl. ........................ 375/341; 375/343; 342/386
(58) Field of Search ................................ 375/341, 343, 375/316, 340; 342/386

(56) References Cited

U.S. PATENT DOCUMENTS

| 4,821,294 A | * | 4/1989 | Thomas, Jr. ................. 375/343 |
| 5,056,106 A | * | 10/1991 | Wang et al. ................. 375/130 |
| 5,414,729 A | * | 5/1995 | Fenton ......................... 375/149 |
| 5,537,443 A | * | 7/1996 | Yoshino et al. ............. 375/340 |
| 5,694,416 A | * | 12/1997 | Johnson ....................... 375/148 |
| 5,982,811 A | * | 11/1999 | Harrison et al. ............ 375/150 |

* cited by examiner

*Primary Examiner*—Stephen Chin
*Assistant Examiner*—Lenny Jiang
(74) *Attorney, Agent, or Firm*—Price and Gess (57) ABSTRACT

A method for mitigating multipath effects in radio systems which is based on searching for and finding a maximum likelihood estimate of range for a received signal is provided. In determining the maximum likelihood estimate, the correlation process uses a high resolution step method in processing the received signal sample values to develop an estimation statistic. The estimation statistic using the correlations of the received signal is based on a new derived representative set of coefficients formed from a nonlinear combination of parameters of the received signal transformed into a linearly solvable invertible parameter set allowing solution of the maximization process of the estimation statistic over a reduced dimension search space. Additionally there is a method of constraining the relative amplitude of received secondary signals to obtain a refinement of the optimal solution of range. The method includes a process to reduce the magnitude of the processing required by the receiver by reducing the size of the overall sample of the signal that must be managed by the receiver. The method may be used in a signal environment where multiple secondary path signals are received by the signal ranging system.

11 Claims, 6 Drawing Sheets

METHOD FOR MITIGATING MULTIPATH EFFECTS IN RADIO SYSTEMS

CROSS REFERENCE TO RELATED APPLICATIONS

This application is a continuation of Ser. No. 08/934,493 U.S. Pat. No. 6.031.881 filed Sep. 19, 1997, for METHOD FOR MITIGATING MULTIPATH EFFECTS IN RADIO RANGING SYSTEMS, which in turn was copending with and claims priority from provisional application Serial No. 60/026,318, filed on Sep. 19, 1996, for NOVEL METHOD IN MITIGATING MULTIPATH EFFECTS IN RADIO RANGING SYSTEMS.

BACKGROUND OF THE INVENTION

1. Field of the Invention

This invention relates to signal transmission ranging systems such as radar, sonar, positioning systems and the like, and more specifically a method of reducing system errors caused by reception of secondary path signals.

2. Description of Related Art

Radio ranging systems use the time of propagation of radio signals to obtain the range (distance) between points of interest. A classic example of a radio ranging system is radar. With radar the observed time of the transmitted radar signal in propagating to the target and returning to the radar receiver, then scaled by the speed of propagation, accomplishes ranging. Sonar is a direct acoustic analog of radar and is included as a ranging system also amenable to application of the subject invention. With Global Positioning System, GPS, or GPS-like satellite positioning systems, the time at which a satellite signal is received is compared to the time the satellite transmitted that signal, information available to the user, and then scaled by propagation speed to obtain range from satellite to receiver. In satellite positioning systems, a user's position is the information generally desired and is obtained by exploiting understood trilateration techniques using the inferred ranges to a constellation of satellites whose positions in space are a priori known.

Figure 1:
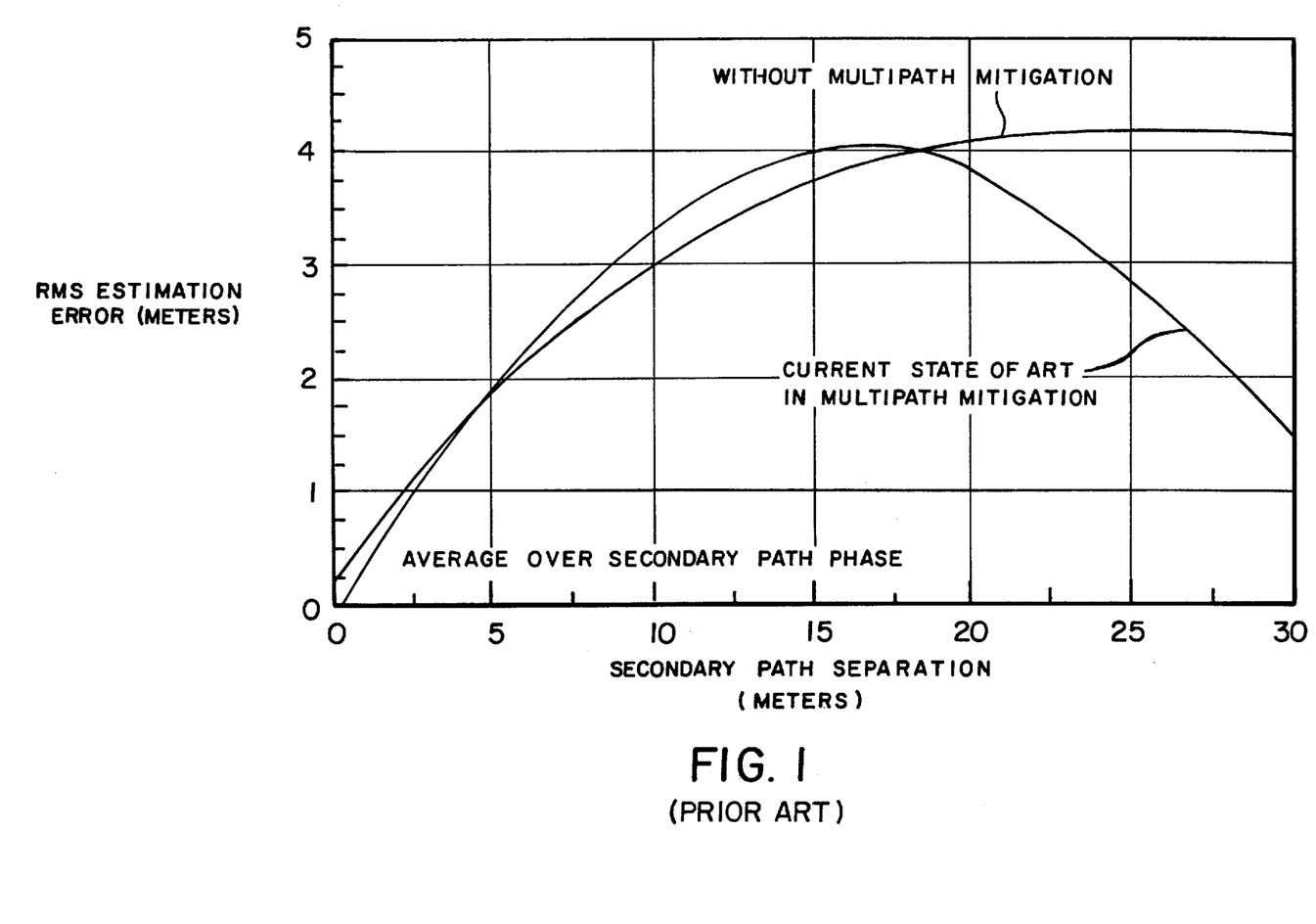
FIG. 1 is a graph that illustrates current prior art error statistics in the presence of multipath signals.

In radio and acoustic ranging systems a commonly observed effect occurs due to the reception of one or more secondary path signals associated with reflecting surfaces positioned to provide those signals. In television, multipath, the term used to denote this phenomenon is manifested as undesired echoes or ghosts of the image transmitted. In radio ranging systems multipath is manifested as errors in range which cannot be directly compensated unless the parameters of the multipath signal are known. Although, the effect of multipath signals is generally deleterious in radar and sonar, the information on the multipath signal has been used to assist in defining target position. To illustrate the severity of multipath effects in an exemplary radio ranging system such as GPS, the ranging error incurred due to multipath, with and without the use of a current state-of-the-art technique to reduce those effects, is shown in FIG. 1.

Multipath interference is coherent, or nearly so, with respect to the direct path signal, i.e., it has the same or very nearly the same spectrum as the direct path signal. For that reason it is particularly difficult to mitigate its effects. Filtering and other such commonly used means in the art of suppressing undesired signals are ineffective with multipath.

A number of methods have been put to use with modest success to mitigate multipath effects in radar and GPS. The simplest is the use of a signal receiving antenna that substantially reduces the response of the receiving apparatus to wavefronts originating from the presumed direction of the reflected signal. However, when the direct path and the reflected secondary path signals arrive at the antenna from the same or nearly the same direction, an undesired degradation of the receiving apparatus response to the direct path signal is experienced. This can seriously compromise ranging performance.

More significant for mitigating multipath effects are methods broadly described as algorithmic. One of the known multipath mitigation algorithms now in use has a performance shown in FIG. 1. As described in the literature, the technique employs methods for decomposing the signal correlation function to permit inferring the multipath parameters: wavefront intensity, path separation delay, and path phase shift, of the secondary path wavefront relative to the direct path wavefront, and thereby backing out or removing its effects on the measurement of the direct path delay. This and other similar algorithms are now implemented in receivers which incorporate microprocessors or special purpose computing apparatus to execute code embodying these algorithms.

The method or process of the present invention for mitigating multipath in GPS or radar or sonar receivers, or other similar communication systems, implements a substantially different method of operation than the prior art as described above and provides an improved level of performance, in fact, near the limiting performance bounds with a substantially reduced computational burden. This is a crucial result because it makes feasible in practice accuracies of position fixes not heretofore achievable, thereby allowing numerous applications in the fields of radar, sonar and GPS or GPS-like satellite positioning systems not otherwise feasible. In sum, the accuracy achieved with the subject invention exceeds the accuracy achieved by the current state of the art by a substantial factor. The computational efficiency of the invention permits achieving this level of performance with a parsimony of computational apparatus not achieved in the present art.

OBJECTS AND SUMMARY OF THE INVENTION

One object of the invention is to reduce the calculation time in a method of finding maximum likelihood estimates of range in signal transmission and ranging systems in the presence of multipath signals.

Another object is to provide a two-dimensional search process practical in equipment with limited computation capability.

These objects are achieved by reducing the number of signal samples required in forming signal/modulation cross-correlations and by reducing the multiplication rate. The computational burden of the processor is thereby reduced with increased efficiency in determining the estimation statistic.

A further object is to provide an improved measure of range in the presence of multipath signals with minimal compromise of performance.

The direct propagation path delay of a received signal in the presence of corrupting secondary propagation path signals is optimally estimated according to a process that presents a direct path signal delay estimate and a secondary path signal additional delay estimate as a starting point in a two-dimensional plane. The received signals is cross-correlated with the modulation waveform at the direct path delay estimate and the direct path plus secondary path additional delay estimate. The modulation auto-correlation values for a signal at zero delay and at the secondary path additional delay are determined. These values are used in a set of four linear equations to determine the variables a, b, c and d. The values of a, b, c and d are used to compute the estimation statistic for the pre-selected starting point. The same process is again utilized to determine the estimation statistics for points immediately surrounding the pre-selected starting point. If the estimation statistic for each of the surrounding points is not larger than the estimation statistic at the pre-selected starting point, the delay coordinates of the pre-selected starting point estimate are the optimal estimates of direct path and secondary path additional delays. If the estimation statistic of a surrounding point is larger than the estimation statistic of the pre-selected starting point, the above process is repeated for the surrounding points.

BRIEF DESCRIPTION OF THE DRAWINGS

The exact nature of this invention, as well as other objects and advantages thereof, will be clearly apparent from consideration of the following specifications related to the accompanying drawings in which.

DESCRIPTION OF THE PREFERRED EMBODIMENT

Before describing the operation of the new process it is useful to provide a brief description of the current prior art method of estimating signal delay as applied to GPS equipment. Let $$s(t)=A_s m(t)\sin(\omega_s t) \quad (1)$$

denote the GPS satellite ranging signal, where $A_s$ is the amplitude of the transmitted signal, m(t) the signal modulation which in GPS and some radars is a pseudo-noise coded cyclical waveform, and $\omega_s$ is the angular frequency of the signal carrier. This signal will be scaled due to propagation losses, delayed due to propagation delays, and Doppler shifted due to receiver and satellite range components of motion when observed at the receiver. Thermally induced white noise will be observed with power spectral density denoted by $N_o$, depending on the receiver noise figure, in the receiving apparatus front end competing with this signal. Altogether, this results in the observed signal $$r(t)=Am(t-\tau)\sin((\omega_r t+\theta)+n(t); \; t_o \leq t \leq t_o+T \quad (2)$$

where n(t) denotes the competing noise, A the received signal amplitude, $\tau$ the satellite-to-receiver signal delay, $\omega_r$, the Doppler shifted carrier frequency, $\theta$ the phase shift of this carrier and where $t_o$, is an arbitrary starting time of the interval $[t_o, t_o+T]$ of signal observation.

The process for estimating $\tau$ optimally, in a sense to be described, is to form the cross-correlation of the received signal with an artificially delayed and Doppler shifted replica of the transmitted signal where the delay and Doppler shift are chosen to maximize the correlation. Such structure is referred to as a replica correlator. Clearly each different noise waveform will bring about a different delay and Doppler estimate and consequently a correspondingly different inferred position where each inferred position almost certainly will be different than the actual position. The statistics of the variations of the delay estimates are of particular interest and concern in applications. If the average of the delay estimates is the same as the actual signal delay the estimates are unbiased. The average of the square of the variations from this value if the average is unbiased is the variance. These error types may be combined into one measure: the sum of the variance and the square of the bias, referred to as the mean square error. The square root of mean square error, or root mean square, rms, value, is most generally presented, since it has the physical significance of the variables it derives from. An optimal estimator produces unbiased, minimum variance estimates. That is very nearly precisely what the replica correlator accomplishes under the conditions where equation (2) applies, that is, where no multipath is present. Where multipath is present the replica correlator is not optimal as evidenced by the graphs of FIG. 1.

It is inconvenient to form the correlation function on the signal directly observed as is described by equation (2) for two reasons; its spectrum is centered about the carrier which makes inconvenient the transformation of this signal to a discretized form suitable for digital computer processing, and Doppler shift is present and may be unknown. In the current GPS art what is commonly done at the receiver to avoid these problems is to use a voltage sensitive local oscillator, or equivalent, to track the Doppler shifted carrier frequency. This is then used, as in homodyne radio receivers, to translate the received signal to base band. Also involved in this process is a modulation tracking loop which is known in the art and not the subject of this invention. Further, the invention herein described assumes these functions are performed. The translator operates to preserve the essential ranging information carried by the received signal. It does this by generating a sinusoid and cosinusoid, both in synchronism with the Doppler shifted carrier, and uses these in concert with non critical low-pass filters to generate two base band signals often referred to as the I and Q, in-phase and quadrature, channel signals. As is well understood in the art these are mathematically equivalent to a complex valued signal with corresponding real and imaginary parts given by $$\tilde{r}_R(t)=Am(t-\tau)\cos(\theta)+\tilde{n}_R(t)$$

$$\tilde{r}_I(t)=Am(t-\tau)\sin(\theta)+\tilde{n}_I \quad (3)$$

equivalent to the complex valued signal $$\tilde{r}(t)=Ae^{j\theta}m(t-\tau)+\tilde{n}(t) \quad (4)$$

The base band signal has range information bearing spectral content restricted to the modulation and therefore may be conveniently sampled and converted to a digital format suitable for digital computer processing. That no information is lost if the sampling rate does not fall below the modulation bandwidth is well understood in the art. Also, that the cross correlation is the optimal estimation statistic can be shown by inspection of the generalized likelihood function. The generalized likelihood function is the conditional probability density of the observations, $\tilde{r}(t)$ suitably discretized, given estimates of the unknown signal related parameters of amplitude, A, phase, θ, and delay, τ, and can be written as $$P_{f|\hat{A},\hat{\theta},\hat{\tau}} = \qquad (5)$$
$$k \exp\left[\frac{2}{N_o}\hat{A}\left[\cos\theta\int_{t_0}^{t_0+T}\tilde{r}_R(t)m(t-\hat{\tau})dt + \sin\theta\int_{t_0}^{t_0+T}\tilde{r}_I(t)m(t-\hat{\tau})dt\right]\right]$$

where k denotes a probability normalizing constant. If certain conditions apply, which will be described, the optimal estimates of the unknown parameters are that set $(\hat{A},\hat{\theta},\hat{\tau})$ which maximizes this function or equivalently the exponent $$\Lambda = \frac{2}{N_o}\hat{A}\left[\cos\theta\int_{t_0}^{t_0+T}\tilde{r}_R(t)m(t-\hat{\tau})dt + \sin\theta\int_{t_0}^{t_0+T}\tilde{r}_I(t)m(t-\hat{\tau})dt\right] \qquad (6)$$

of the exponential and are referred to as maximum likelihood, ML, estimates. As is known in the art ML estimates are, with increasing observation time, asymptotically unbiased and minimum variance, strongly motivating ML estimation. In order to obtain an optimum ranging estimate in this sense, an NE estimate of signal delay is desired. The carrier phase, as well as signal amplitude are nuisance parameters in this process. Carrier phase may be eliminated from consideration by use of the following technique. If a function is differentiable it is necessary that its derivatives be zero at its extrenal values. Therefore a necessary condition for an external, in this case a maximum, is that $$0 = \qquad (7)$$
$$\frac{\partial \Lambda}{\partial \hat{\theta}} = \frac{2\hat{A}}{N_0}\left[-\sin\theta\int_{t_0}^{t_0+T}\tilde{r}_R(t)m(t-\hat{\tau})dt + \cos\hat{\theta}\int_{t_0}^{t_0+T}\tilde{r}_I(t)m(t-\hat{\tau})dt\right]$$

which has two solutions given by $$\sin\hat{\theta} = \frac{\int_{t_0}^{t_0+T}\tilde{r}_I(t)m(t-\hat{\tau})dt}{\left|\int_{t_0}^{t_0+T}\tilde{r}(t)m(t-\hat{\tau})dt\right|}, \qquad (8)$$

$$\cos\hat{\theta} = \frac{\int_{t_0}^{t_0+T}\tilde{r}_R(t)m(t-\hat{\tau})dt}{\left|\int_{t_0}^{t_0+T}\tilde{r}(t)m(t-\hat{\tau})dt\right|}$$

and $$\sin\hat{\theta} = -\frac{\int_{t_0}^{t_0+T}\tilde{r}_I(t)m(t-\hat{\tau})dt}{\left|\int_{t_0}^{t_0+T}\tilde{r}(t)m(t-\hat{\tau})dt\right|}, \qquad (9)$$

$$\cos\hat{\theta} = -\frac{\int_{t_0}^{t_0+T}\tilde{r}_R(t)m(t-\hat{\tau})dt}{\left|\int_{t_0}^{t_0+T}\tilde{r}(t)m(t-\hat{\tau})dt\right|}$$

The first solution, equation (8), corresponds to a maximum, the second, equation (9), to a minimum. Substituting equation (8) corresponding to the maximum into equation (6) results in $$\Lambda = \frac{2\hat{A}}{N_o}\left|\int_{t_0}^{t_0+T}\tilde{r}(t)m(t-\hat{\tau})dt\right| \qquad (10)$$

The delay parameter $\hat{\tau}$ that maximizes the magnitude of the cross correlation function $\int \tilde{r}(t)m(t-\hat{\tau})dt$ also maximizes $\Lambda$ for any A. The derivation of equation (10) completes the demonstration that the cross correlation function is the statistic which permits obtaining an optimal, in the ML sense, estimate of the delay parameter from observations over the stated interval on $\tilde{r}(t)$, in the case when no multipath is present.

In digital implementations the signal/modulation correlations desired are the sum of the products of corresponding samples of the observed signal real and imaginary parts and the delayed modulation. Means of artificially generating samples of arbitrarily delayed modulation waveforms are well known in the art. One method may be described succinctly as follows. Sample values of the modulation waveform are generated using a priori knowledge of the modulation waveform. Using this information samples of the modulation may be formed as for instance by Fourier methods at any arbitrary set of times including those corresponding to the waveform delayed by any arbitrary amount.

When multipath is present the observed signal will consist of the additive combination of each signal component, i.e., added to the direct path observed signal will be observed the various secondary path or reflected signals. Each of these reflected signals can be described with exactly the same parameters, amplitude, phase, and delay as the direct path signal. In the simplest case where only one secondary path signal is operating, the case most commonly addressed in the art, the base band signal observed can be expressed as $$\tilde{r}(t) = Ae^{j\theta}[m(t-\tau)+\alpha e^{j\phi}m(t-\tau-\Delta\tau)]+\tilde{n}(t) \qquad (11)$$

where, as in the non-multipath case, θ represents the direct path carrier phase and A its amplitude. α represents the relative amplitude of the reflected signal and φ its carrier phase relative to the direct path carrier phase. Also, as in the non-multipath case, τ represents the delay of the direct path signal. Δτ represents the additional delay of the reflected signal, which we refer to herein as the path separation. Because reflected signals must propagate over greater distances than direct path signals, Δτ must be a positive quantity. Only in special, generally contrived, circumstances will the intensity of a reflected wave exceed that of the incident wave; therefore, the relative amplitude of the reflected signal, α, will, most generally, be less than unity.

In the multipath case the generalized likelihood function is given by $$P_f | \hat{A}, \hat{\theta}, \hat{\tau}, \hat{\alpha}, \hat{\phi}, \hat{\Delta\tau} = \qquad (12)$$
$$k \exp\left[-\frac{2}{N_o}\int_{t_0}^{t_0+T}\left|\tilde{r}(t)-\hat{A}e^{j\hat{\theta}}\left[m(t-\hat{\tau})+\hat{\alpha}e^{j\hat{\phi}}m(t-\hat{\tau}-\hat{\Delta\tau})\right]\right|^2 dt\right]$$

where, as in the non-multipath case, k denotes a probability normalizing constant. Here we have a substantially more complicated maximization problem than with no multipath, involving not only the direct path and path separation delay estimates, $\hat{\tau}$ and $\hat{\Delta\tau}$, but also the four parameters $\hat{A}$, $\hat{\theta}$, $\hat{\alpha}$, and $\hat{\phi}$ which, in the context of the desired objective, are referred to as nuisance parameters. The obvious solution is to search over the feasible range of all six of these parameters until a global maxima is obtained. Six dimensional searches present an impractical computational burden. Normally methods similar to the one presented in the non-multipath case are used to derive an alternative estimation statistic free of the nuisance parameters. This can be done successfully for two of the parameters, carrier phase $\hat{\theta}$ and amplitude $\hat{A}$ resulting in the estimation statistic $$\Lambda = \frac{\left| \int_{t_0}^{t_0+T} \tilde{r}(t) \left[ m(t-\hat{\tau}) + \hat{\alpha} e^{j\hat{\phi}} m(t-\hat{\tau}-\hat{\Delta\tau}) \right] dt \right|^2}{\int_{t_0}^{t_0+T} \left| m(t-\hat{\tau}) + \hat{\alpha} e^{j\hat{\phi}} m(t-\hat{\tau}-\hat{\Delta\tau}) \right|^2 dt} \quad (13)$$

thereby reducing the search process to four dimensions in the parameters $\hat{\alpha}$, $\hat{\phi}$, $\hat{\tau}$, and $\hat{\Delta\tau}$. In order to further attempt to reduce the computational burden, the remaining two nuisance parameters $\hat{\alpha}$ and $\hat{\phi}$ could be eliminated by the same means, i.e., setting derivatives with respect to these parameters to zero and finding solutions which can be used to eliminate these parameters in the resulting estimation statistic. Unfortunately this results in a pair of analytically intractable non-linear, transcendental equations potentially solvable only by numerical means and with an attendant substantial computational burden.

The first process of this invention is based on reducing the estimation statistic by deductive means involving nonobvious transformations to an expression involving only the direct path delay and path separation parameters. This then reduces the problem of finding the maximum likelihood (ML) estimates of delay and path separation, the kernel information desired to extract from the signal observations, to a two dimensional search practical to conduct with contemporary microprocessors or other similar computational elements. In order to describe this statistic it is necessary to define two functions; one is the cross-correlation of the observed signal with the modulation waveform $$R(\hat{\tau}) = \int_{t_0}^{t_0+T} \tilde{r}(t) m(t-\hat{\tau}) dt \quad (14)$$

identical to the cross correlation function employed in the non-multipath case, and the other is the autocorrelation function of the modulation $$K(\hat{\tau}) = \int_{t_0}^{t_0+T} m(t) m(t-\hat{\tau}) dt \quad (15)$$

Since the receiver has complete knowledge of the transmitted waveform, $K(\hat{\tau})$ is an a priori known function which may be generated and stored in the receiver in tabular form.

There are situations in which the receiver might distort the modulating function by introducing phase variations (due to non-linearities or other causes) observed at baseband not originally contained in the real valued model of m(t) described in equation (1). The resulting departure from the assumed real valued model can degrade the performance of the maximum likelihood direct path delay estimates. This problem can be mitigated, however, by using a complex valued model for m(t) in equation (11) which in practice can be determined from measurements made on the receiver used.

Using the correlation functions described by equations (14) and (15) the estimation statistic implemented in this invention can be described by $$\Lambda = 2Re[(a-jc)R(\hat{\tau})] + 2Re[(b-jd)R(\hat{\tau}+\hat{\Delta\tau})] + 2(ab+cd)K(\hat{\Delta\tau}) - (a^2+b^2+c^2+d^2)K(0) \quad (16)$$

where Re means real part, and where the quantities a, b, c, and d resulting from transformations of the nuisance parameters $\hat{A}$, $\hat{\alpha}$, $\hat{\theta}$, and $\hat{\phi}$ and functions thereof are given by $$a = \frac{(K(0)-\gamma_i)R_R(\hat{\tau}) - K(\hat{\Delta\tau})R_R(\hat{\tau}+\hat{\Delta\tau})}{K^2(0) - \gamma_i K(0)(1-\alpha_c^2) - \alpha_c^2\gamma_i^2 - K^2(\hat{\Delta\tau})} \quad (17)$$

$$b = \frac{(K(0)+\alpha_c^2\gamma_i)R_R(\hat{\tau}+\hat{\Delta\tau}) - K(\hat{\Delta\tau})R_R(\hat{\tau})}{K^2(0) - \gamma_i K(0)(1-\alpha_c^2) - \alpha_c^2\gamma_i^2 - K^2(\hat{\Delta\tau})}$$

$$c = \frac{(K(0)-\gamma_i)R_I(\hat{\tau}) - K(\hat{\Delta\tau})R_I(\hat{\tau}+\hat{\Delta\tau})}{K^2(0) - \gamma_i K(0)(1-\alpha_c^2) - \alpha_c^2\gamma_i^2 - K^2(\hat{\Delta\tau})}$$

$$d = \frac{(K(0)+\alpha_c^2\gamma_i)R_I(\hat{\tau}+\hat{\Delta\tau}) - K(\hat{\Delta\tau})R_I(\hat{\tau})}{K^2(0) - \gamma_i K(0)(1-\alpha_c^2) - \alpha_c^2\gamma_i^2 - K^2(\hat{\Delta\tau})}$$

where $\alpha_c$ is a constant described later, and with $\gamma_i$; i=0, a term used later, set to zero. It is observed that the expressions on the right sides of equations (16) and (17) depend only on the direct path delay estimate, $\hat{\tau}$, and path separation estimate, $\hat{\Delta\tau}$, and hence reduces the problem of estimating direct path delay and path separation to two dimensions. This technique is readily extensible to the general case of a multiplicity of reflections competing with the direct path signal.

In the next stage of the process a method to introduce constraints on the parameter $\hat{\alpha}$ into the $\hat{\tau}$, $\hat{\Delta\tau}$ ML estimation search process are introduced. Since $\alpha$ is almost always never more than unity such constraint provides improved estimation results as compared to the unconstrained results. This constraint is accomplished as follows. Let $\alpha_c$ denote the desired maximum value constraint on $\hat{\alpha}$. First, after having completed computation of a, b, c and d with $\gamma_i$=0, compute $$\hat{\alpha}^2 = \frac{b^2+d^2}{a^2+c^2} \quad (18)$$

and if $\hat{\alpha}^2$ is not greater than $\alpha_c^2$, then compute the estimation statistic using eq (16) and assign that value to the point $(\hat{\tau}, \hat{\Delta\tau})$. Whereas, if $\hat{\alpha}^2$ is greater than $\hat{\alpha}_c^2$, compute $$X = \alpha_c^4 |R(\hat{\tau}+\hat{\Delta\tau})|^2 - \alpha_c^2 |R(\hat{\tau})|^2$$

$$Y = 2\alpha_c^2 \{K(0)[|R(\hat{\tau}+\hat{\Delta\tau})|^2 + |R(\hat{\tau})|^2]$$

$$-2K(\hat{\Delta\tau})Re[R^*(\hat{\tau})R(\hat{\tau}+\hat{\Delta\tau})]\}$$

$$Z = |K(0)R(\hat{\tau}+\hat{\Delta\tau}) - K(\hat{\Delta\tau})R(\hat{\tau})|^2$$

$$-\alpha_c^2 |K(0)R(\hat{\tau}) - K(\hat{\Delta\tau}) - K(\hat{\Delta\tau})R(\hat{\tau}+\hat{\Delta\tau})|^2 \quad (19)$$

Then use these to compute $$\gamma_i = \frac{-Y + (-1)^i \sqrt{Y^2 - 4XZ}}{2X} \quad (20)$$

for i=1 and 2. Recompute a, b, c, and d with $\gamma_1$ and with $\gamma_2$. With each set of the coefficients a, b, c, d calculate the estimation statistic $\Lambda$ using equation (16). Choose the largest resulting value and assign that value to the point $(\hat{\tau}, \hat{\Delta\tau})$. This is the value of the estimation statistic incorporating the constraint $\hat{\alpha} \leq \alpha_c$ for any particular pair of direct path delay, $\hat{\tau}$, and path separation, $\hat{\Delta\tau}$, estimates. The pair of estimates $\hat{\tau}$ and $\hat{\Delta\tau}$ that generate the largest value of the estimation statistic are the ML estimates $\hat{\tau}_{ML}$ and $\hat{\Delta\tau}_{ML}$ of $\hat{\tau}$ and $\hat{\Delta\tau}$.

The estimation statistic given by equation (16) is unimodal. This property allows the search for those values of $\hat{\tau}$ and $\hat{\Delta\tau}$ that maximize it to be accomplished in a directed and therefore computationally efficient manner. Starting with an arbitrary selection of $\hat{\tau}$ and $\hat{\Delta\tau}$ increase or decrease these values according to which of the neighboring values produces a larger value of the estimation statistic. Continue this process iteratively until neighboring values do not exceed the value at a selected point. The pair of values of $\hat{\tau}$ and $\hat{\Delta\tau}$ at that point are the ML estimates, $\hat{\tau}_{ML}$ and $\hat{\Delta\tau}_{ML}$, of $\hat{\tau}$ and $\hat{\Delta\tau}$.

The estimation statistic given by equation (16) is unimodal. This property allows the search for those values of $\hat{\tau}$ and $\hat{\Delta\tau}$ that maximize it to be accomplished in a directed and therefore computationally efficient manner. Starting with an arbitrary selection of $\hat{\tau}$ and $\hat{\Delta\tau}$ increase or decrease these values according to which of the neighboring values produces a larger value of the estimation statistic. Continue this process iteratively until neighboring values do not exceed the value at a selected point. The pair of values of $\hat{\tau}$ and $\Delta\tau$ at that point are the ML estimates, $\hat{\tau}_{ML}$ and $\hat{\Delta\tau}_{ML}$, of $\hat{\tau}$ and $\hat{\Delta\tau}$.

Finally, a method to obtain ML estimates of the parameters A, θ, α, and φ, the direct path amplitude and phase and the secondary path relative amplitude and relative phase is provided. In certain ranging systems such as radar and in GPS positioning this information can be useful, as was indicated earlier.

Use the quantities a, b, c, and d corresponding to the ML estimates of τ and Δτ, $\hat{\tau}_{ML}$ and $\hat{\Delta\tau}_{ML}$, obtained at convergence of the search process described above to first obtain $$\hat{A}_{ML} = \sqrt{a^2 + c^2} \quad (21)$$

and $$\hat{\theta}_{ML} = \frac{\pi}{2}[1 - \text{sgn}(a)]\text{sgn}(c) + \tan^{-1}\left(\frac{c}{a}\right) \quad (22)$$

where sgn (•) means sign of the quantity • in the parentheses. Then use these results to obtain $$\hat{\partial}_{ML} = \frac{\sqrt{b^2 + d^2}}{\hat{A}_{ML}} \quad (23)$$

and $$\hat{\phi}_{ML} = \frac{\pi}{2}[1 - \text{sgn}(b)]\text{sgn}(d) + \tan^{-1}\left(\frac{d}{b}\right) - \hat{\theta}_{ML} \quad (24)$$

Figure 2:
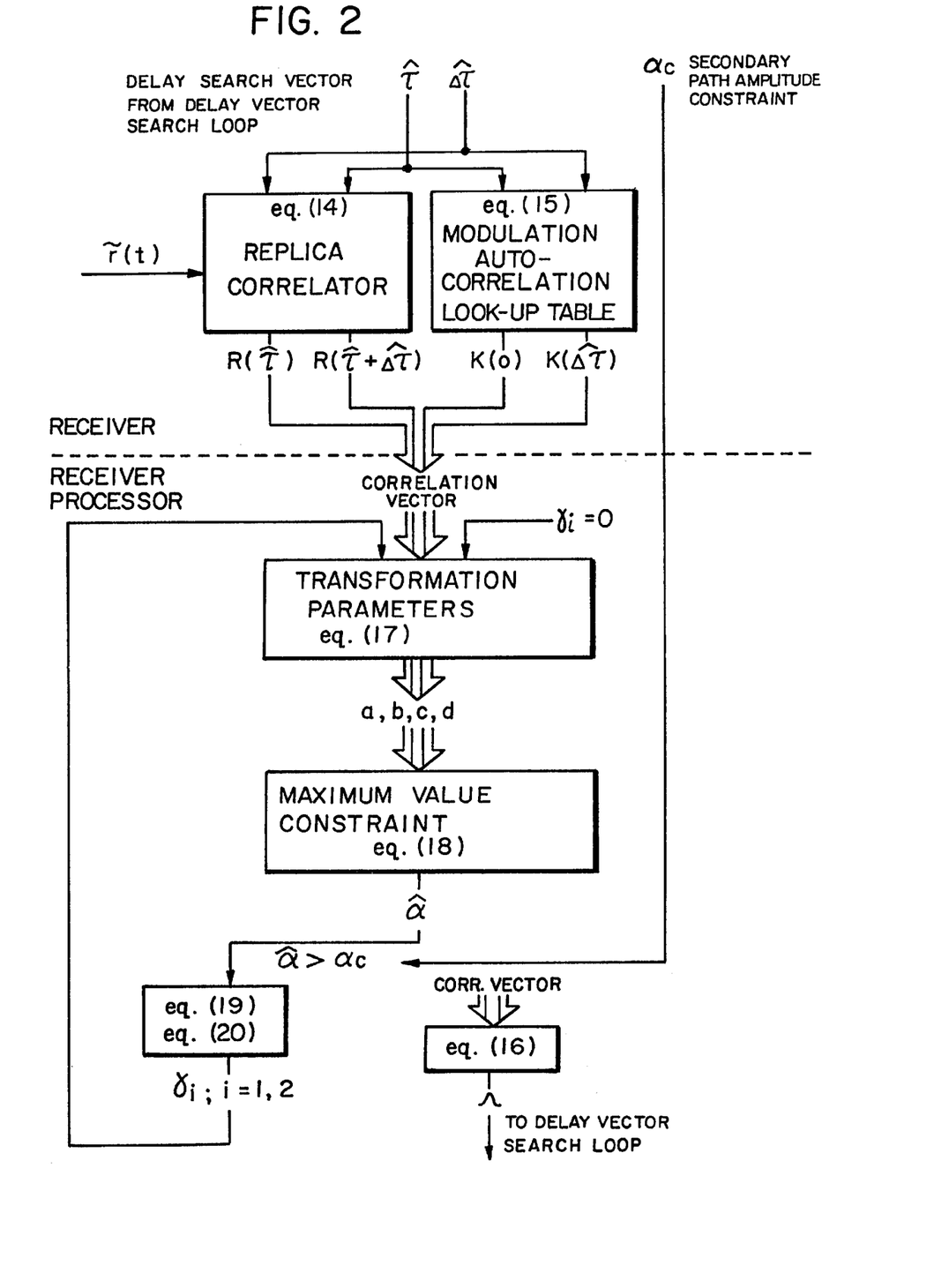
FIG. 2 is a block design that illustrates the multipath mitigation method flow according to the present invention.

The process as described above constitutes one kernel element of the multipath mitigation invention and is shown in flow chart form in FIG. 2.

Figure 3:
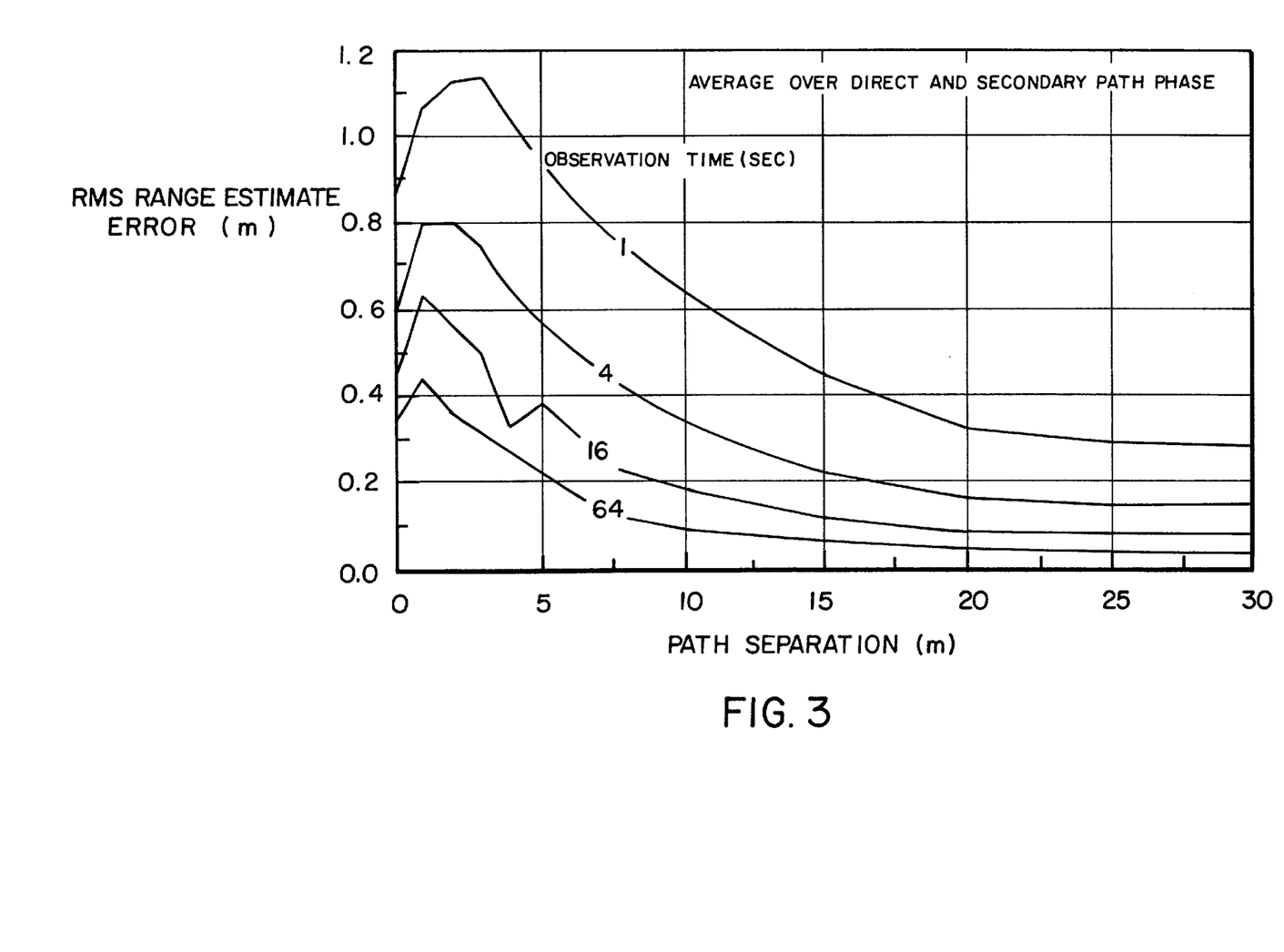
FIG. 3 is a graph that illustrates the multipath mitigation process rms range estimate error.
Figure 4:
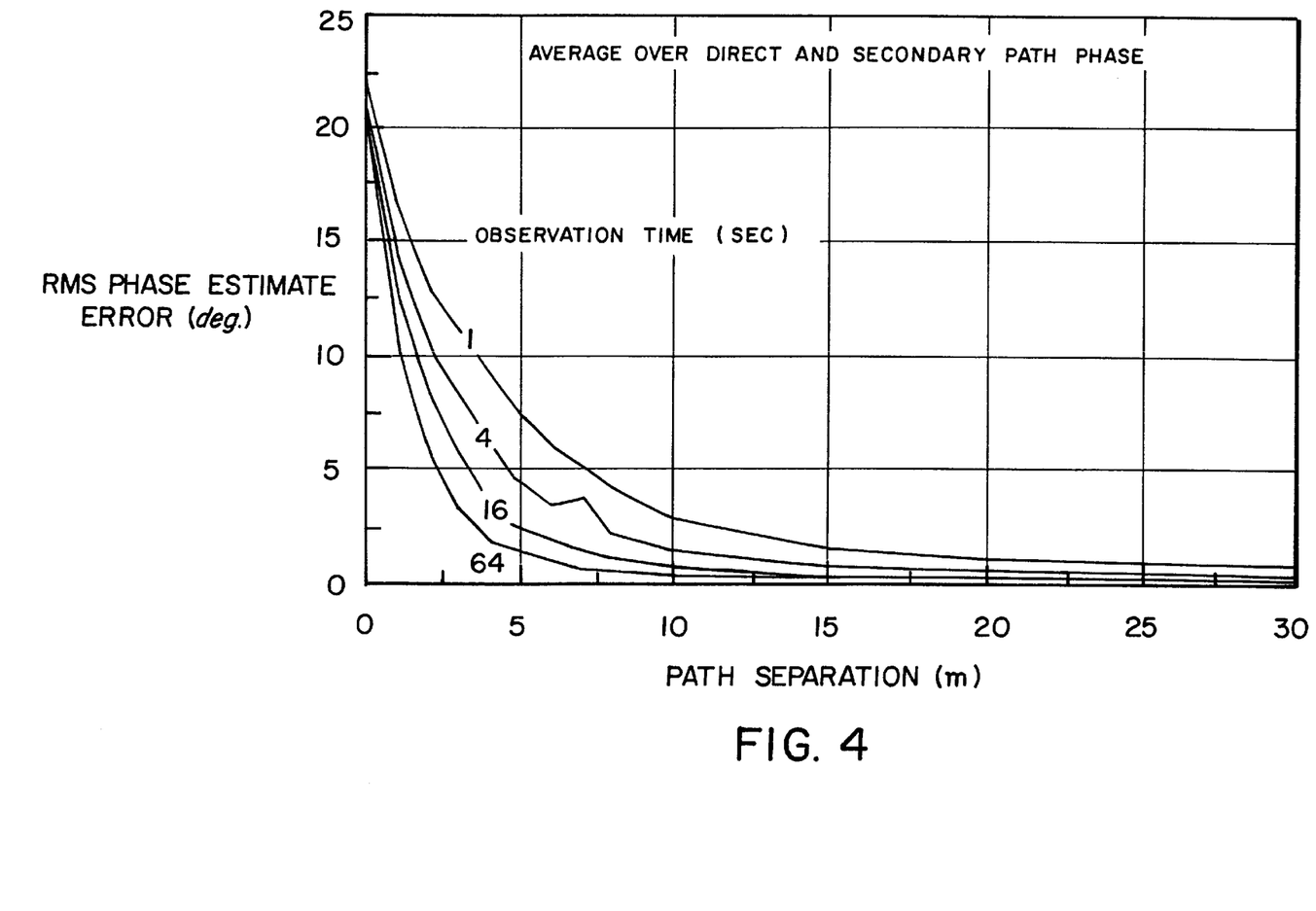
FIG. 4 is a graph that illustrates the multipath mitigation process rms phase estimation error.

Its estimation performance in the context of GPS is shown in FIGS. 3 and 4 in which the direct path delay and phase estimation rms errors are shown under conditions comparable to those relating to FIG. 1.

It is noted from these figures that the rms estimation errors decrease with increasing signal observation time. In application, this favorable behavior permits controlling the deleterious effects of multipath to any desired level. This is in contrast to methods previously described herein as representative of the current art of multipath mitigation. With these current art methods, bias errors independent of signal observation time dominate the rms errors at relatively small path separation and therefore these methods are incapable of providing the same level of error control.

A second kernel element of this invention is a method to efficiently generate the signal/modulation cross-correlation values needed to determine the estimation statistic described by equation (16). In ranging systems the transmitted signals, optimized for ranging, are typically characterized by a large time-bandwidth product. A major problem is that conventional discrete, digital, means, as for example described here in connection with optimal range estimation in a non-multipath environment, are computation intensive, especially with regard to the number of multiplications per unit of time. Signal/modulation cross-correlations are formed by summing products of signal sample values with corresponding artificially delayed modulation sample values. In GPS, for example, this involves multiplications at a rate upwards of 20 million signal samples per second. In radar that rate can be substantially greater.

In GPS, radar and other signal ranging systems the modulation waveforms typically are synthesized from identically recurrent structural features whose shape and location are a priori known. Examples include, but are not limited to, frequency-hopping and pseudo-noise randomly coded waveforms. These waveforms are characterized by recurring transients each with identical shape. With pseudo-noise codes the transients occur at each change in modulation polarity. With frequency hopping the transients occur at each frequency change. It is these transients and not the remaining portions of the signal waveform that convey the desired ranging information, and therefore signal samples in the remaining portions of the waveform do not materially contribute to the information desired. This is illustrated by the graphs displayed in FIG. 5 which show only a marginal decrease in the rms errors of range estimates with an increasing number of signal samples beyond a threshold value, as additional signal samples more distant from the transient are employed.

The first element of this aspect of the invention reduces the number of signal samples required in forming the signal/modulation cross-correlations by taking advantage of the fact of diminishing returns with use of an increasing number of signal samples beyond those in the vicinity of the modulation transient. With the second element of this aspect of the invention the cross-correlation mathematical operations are restructured by averaging the recurring transient components of the signal and modulation waveforms over all occurrences of transients prior to multiplication of signal and delayed modulation sample values. Such averaging typically reduces the multiplication rate and therefore computation burden by 4 to 5 orders of magnitude.

In civilian GPS applications the carrier modulation waveform, called the C/A code, is a periodic waveform consisting of 1023 chips (pulses) of equal duration and uniform amplitude alternated in polarity over the repetition period of one millisecond in what appears to be a random distribution, but the resulting structure is entirely known at the signal receiver. The transitions between alternate polarity chips constitute the recurrent structure utilized advantageously in the invention.

Figure 5:
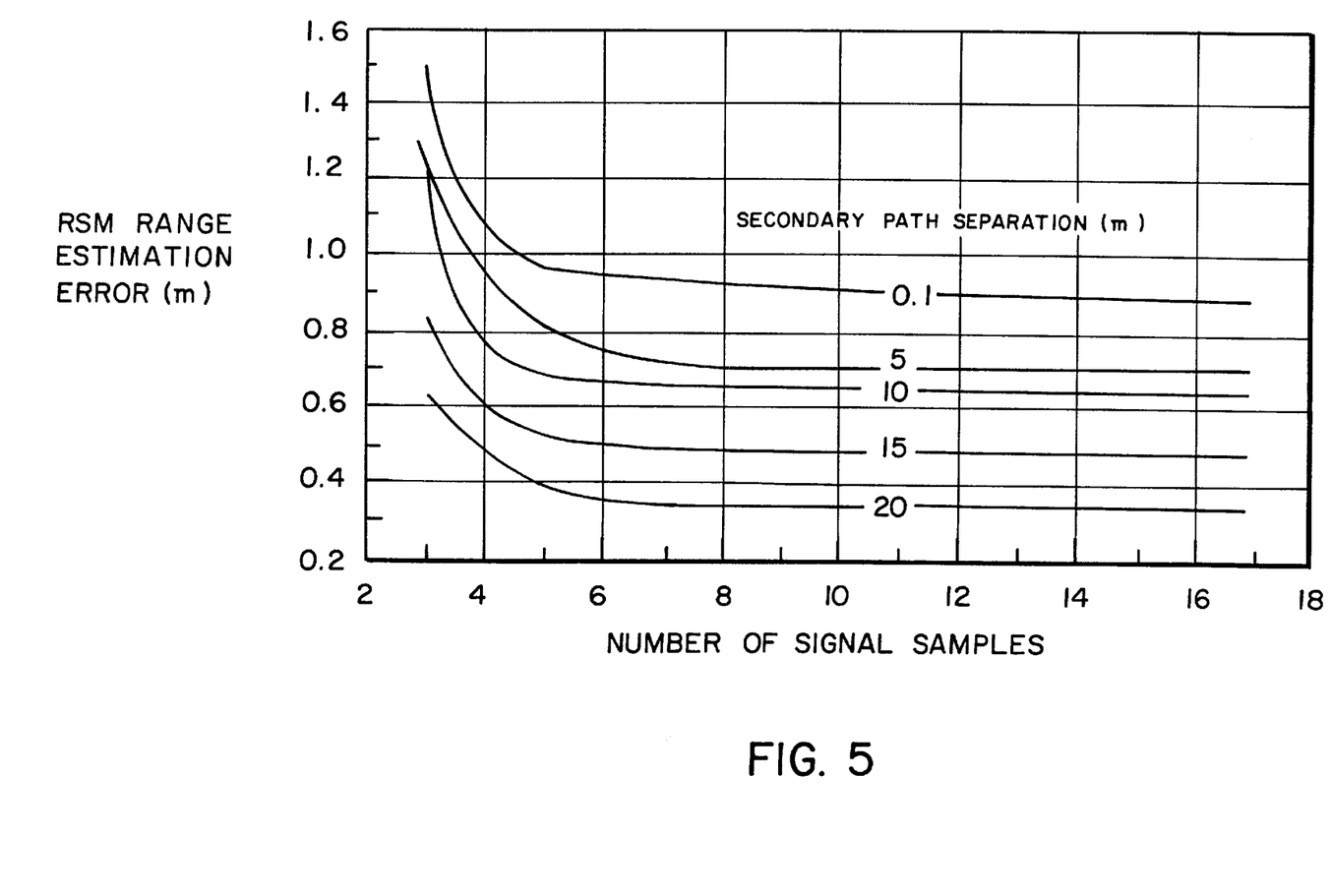
FIG. 5 is a graph that illustrates the marginal effect of increasing sample data on rms range estimate error.

In GPS the receivers signal bandwidth is not uncommonly limited to 10.23 MHz. A minimum sampling rate not less than 20.46 MHz is required to preserve ranging information carried by these signals. Thus, over the duration of signal observation time, commonly 1 second or greater, required to achieve acceptably high levels of accuracy in estimating direct path signal propagation delay, absent the use of the technique described here, in excess of 20 million signal sample values multiplications are required to be performed to extract the correlation information needed by the process. However, only regions of the code waveform in the vicinity of transitions contain range information. Because the C/A code waveform is completely known, code tracking techniques well understood in the art can be employed to locate these transition regions. Further, these transitions are either negative or positive going, but with identical shapes. In the first element of this aspect of the invention corresponding samples collected from each transition region are brought into like polarity using the a priori known modulation waveform information and averaged over the observation interval; resulting thereby in a single subset of sample values bearing all the ranging information contained in the complete set. In the second element of this aspect of the invention the correlation of these with a corresponding subset of modulation waveform samples provides the desired correlation values. As shown in FIG. 5 only 7 sample values in this example are needed to provide essentially all the range related correlation information conveyed by the signal.

Figure 6:
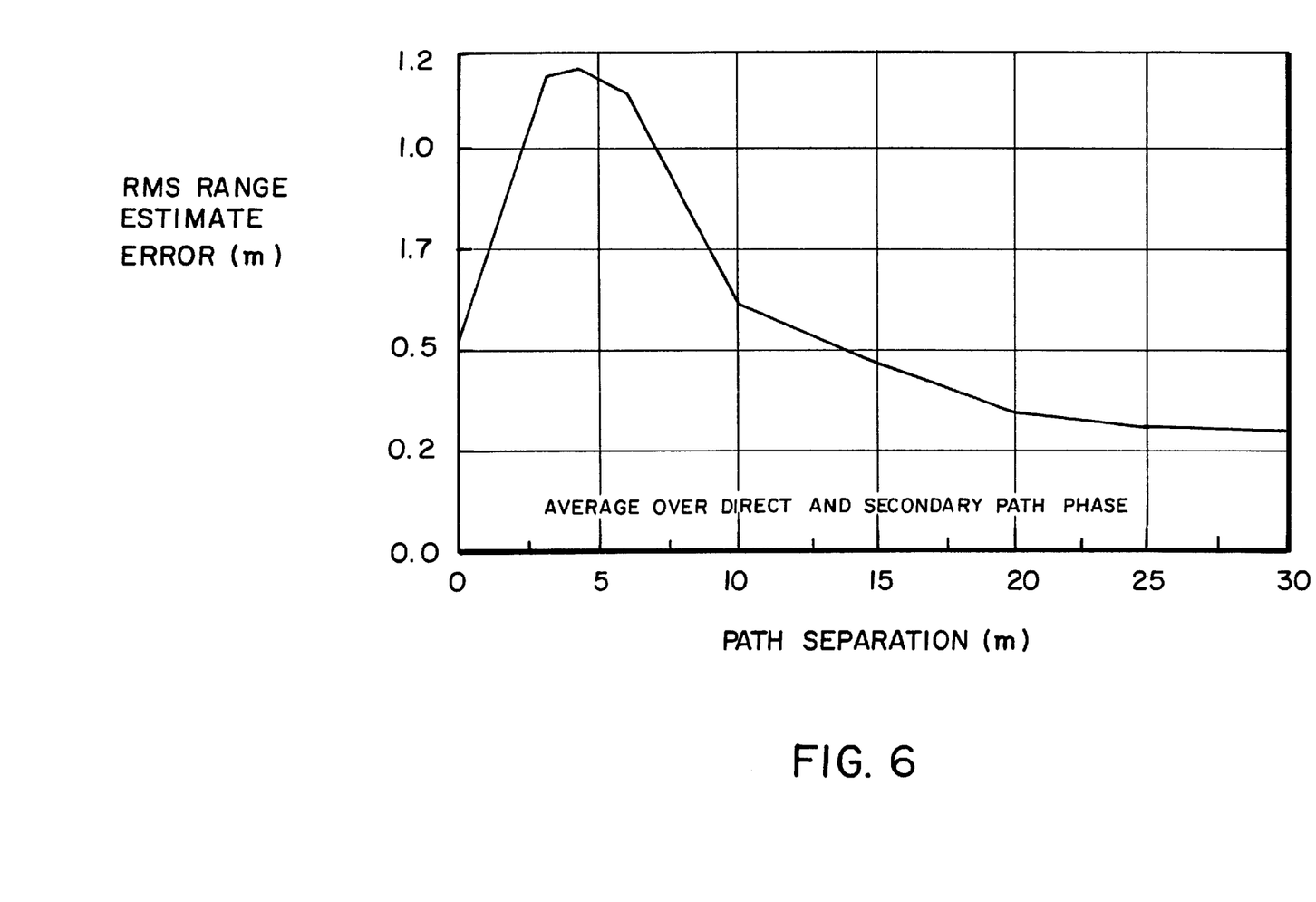
FIG. 6 is a graph that illustrates the reduced direct path estimate uncertainty obtained.

When multipath signals are not present the optimum estimator of signal propagation delay is the replica correlator; and therefore it is not advantageous in that circumstance to use any multipath mitigation algorithm predicated on multipath present. Another aspect of this invention relates to means for improving the performance of the subject invention when multipath is not present. Such improvement is obtained by constraining the secondary path separation estimate to a minimum value which operates to reduce ambiguity of the various parameter estimates observed when the secondary path separation is small or when no multipath is present; thereby improving the direct path delay estimate. This is illustrated in FIG. 6 wherein the secondary path search values in the τ, Δτ search process are constrained to a region of 10 meters or more. It is noted by comparison to FIG. 5 that a significant improvement in direct path delay estimate uncertainty is obtained when the secondary path separation is small, but with little sacrifice in estimate uncertainty for larger secondary path separations.

What is claimed is:

1. A process for optimally estimating the direct path propagation delay of a received signal when also receiving one or more secondary propagation path signals, the process comprising the steps:

A. selecting a direct propagation path signal delay estimate $\hat{\tau}$ and a secondary path additional propagation delay estimate $\hat{\Delta\tau}$ as a point $(\hat{\tau}, \hat{\Delta\tau})$ on a two-dimensional plane;

B. computing the value of the cross-correlation $$R(\hat{\tau}) = \int_{t_0}^{t_0+T} \tilde{r}(t)m(t-\hat{\tau})dt,$$

where $\tilde{r}(t)$ represents the received signal translated to baseband, $m(t-\hat{\tau})$ represents a replica of the signal modulation delayed by $\hat{\tau}$, and $[t_0, t_0+T]$ is the interval of observation of $\tilde{r}(t)$;

C. computing the value of the cross-correlation $$R(\hat{\tau}+\hat{\Delta\tau}) = \int_{t_0}^{t_0+T} \tilde{r}(t)m(t-(\hat{\tau}+\hat{\Delta\tau}))dt,$$

where $m(t-(\hat{\tau}+\hat{\Delta\tau}))$ represents a replica of the signal modulation delayed by $\hat{\tau}+\hat{\Delta\tau}$, and $\tilde{r}(t)$ and $[t_0, t_0+T]$ are as defined in step B;

D. Obtaining the value of the zero-delay signal modulation replica autocorrelation $$K(0) = \int_{t_0}^{t_0+T} m^2(t)dt,$$

and the value of the signal modulation replica autocorrelation $$K(\hat{\Delta\tau}) = \int_{t_0}^{t_0+T} m(t)m(t-\hat{\Delta\tau})dt$$

at the delay $\hat{\Delta\tau}$;

E. computing $$a = \frac{(K(0)-\gamma_i)\mathrm{Re}[R(\hat{\tau})] - \mathrm{Re}[R(\hat{\tau}+\hat{\Delta\tau})K(\hat{\Delta\tau})]}{(K(0)+\gamma_i\alpha_c^2)(K(0)-\gamma_i) - K^2(\hat{\Delta\tau})},$$

$$b = \frac{(K(0)+\alpha_c^2\gamma_i)\mathrm{Re}[R(\hat{\tau}+\hat{\Delta\tau})] - \mathrm{Re}[R(\hat{\tau})K(\hat{\Delta\tau})]}{(K(0)+\gamma_i\alpha_c^2)(K(0)-\gamma_i) - K^2(\hat{\Delta\tau})},$$

$$c = \frac{(K(0)-\gamma_i)\mathrm{Im}[R(\hat{\tau})] - \mathrm{Im}[R(\hat{\tau}+\Delta\tau)K(\hat{\Delta\tau})]}{(K(0)+\gamma_i\alpha_c^2)(K(0)-\gamma_i) - K^2(\hat{\Delta\tau})},$$

$$d = \frac{(K(0)+\alpha_c^2\gamma_i)\mathrm{Im}[R(\hat{\tau}+\hat{\Delta\tau})] - \mathrm{Im}[R(\hat{\tau})K(\hat{\Delta\tau})]}{(K(0)+\gamma_i\alpha_c^2)(K(0)-\gamma_i) - K^2(\hat{\Delta\tau})},$$

using the values obtained in steps B, C and D, where Re stands for the real part and Im stands for the imaginary part, with $\gamma_i=0$ and with $\alpha_c$ a maximum value selected for the secondary path signal relative amplitude;

F. computing an estimation statistic $$\Lambda = 2Re[(a-jc)R(\hat{\tau})] + 2Re[(b-jd)R(\hat{\tau}+\hat{\Delta\tau})]$$
$$-2(ab+cd)K(\hat{\Delta\tau}) - (a^2+b^2+c^2+d^2)K(0)$$

with the values a, b, c, and d obtained from step E;

G. assigning the computed estimation statistic Λ of step F to the point $(\hat{\tau}, \hat{\Delta\tau})$ of step A.

2. The process of claim 1 further comprising the steps of:

H. repeating the steps of claim 1 for a plurality of points in the $\hat{\tau}, \hat{\Delta\tau}$ plane surrounding the point of step A; and I. determining that the estimation statistic of the surrounding points are not greater than the estimation statistic at the point of step A.

3. The process of claim 1 or 2 further comprising the step of:

J. computing $$\hat{A}_{ML} = \sqrt{a^2+c^2}$$

where $\hat{A}_{ML}$ is the optimal estimate of the direct propagation path signal amplitude and a and c were obtained in step E.

4. The process of claim 3 further comprising the step of:

K. computing $$\hat{\theta}_{ML} = \frac{\pi}{2}[1 - \mathrm{sgn}(a)]\mathrm{sgn}(c) + \tan^{-1}\left(\frac{c}{a}\right)$$

where $\hat{\theta}_{ML}$ is the optimal estimate of the direct propagation path received signal carrier phase angle and where a and c were obtained in step E.

5. The process of claim 1 or 2 further comprising the step of:

L. computing $$\hat{\alpha}_{ML} = \sqrt{\frac{b^2 + d^2}{a^2 + c^2}}$$

where $\hat{\alpha}_{ML}$ is the optimal estimate of the secondary propagation path signal relative amplitude and where a, b, c and d were obtained in step E.

6. The process of claim 5 further comprising the step of:

M. computing $$\hat{\phi}_{ML} = \frac{\pi}{2}[1 - \text{sgn}(b)]\text{sgn}(d) + \tan^{-1}\left(\frac{d}{b}\right) - \hat{\theta}_{ML}$$

where $\hat{\phi}_{ML}$ is the optimal estimate of the secondary path signal relative carrier phase and where b and d were obtained in step E for the optimal point, and $\hat{\theta}_{ML}$ was obtained in step K.

7. The process of claim 1, further comprising after step E, the steps:

N. computing $$\hat{\alpha} = \sqrt{\frac{b^2 + d^2}{a^2 + c^2}}$$

where $\hat{\alpha}$ is an estimate of secondary propagation path relative amplitude based on the values of a, b, c and d obtained from step E with $\gamma_i=0$; and O. comparing $\hat{\alpha}$ from step N with $\alpha_c$ and if $\hat{\alpha}$ is not greater than $\alpha_c$ go to steps F and G.

8. The process of claim 7 wherein if a is greater than ac, further comprising the following steps:

P. computing $X = \alpha_c^4 |R(\hat{\tau}+\Delta\hat{\tau})|^2 \alpha_c^2 |R(\tau)^2|^2,$ $Y = 2\alpha_c^2 \{K(0)[|R(\hat{\tau}+\Delta\hat{\tau})|^2 + R(\hat{\tau})|^2]$ $-2K(\Delta\hat{\tau})\text{Re}[R^*(\hat{\tau})R(\hat{\tau}+\Delta\hat{\tau})]\},$ $Z = |K(0)R(\hat{\tau}+\Delta\hat{\tau}) - K(\Delta\hat{\tau})R(\hat{\tau})|^2$ $-\alpha_c^2 |K(0)R(\hat{\tau}) - K(\Delta\hat{\tau})R(\hat{\tau}+\Delta\hat{\tau})|^2$ using the values of $R(\hat{\tau})$, $R(\hat{\tau}+\Delta\hat{\tau})$, $K(0)$ and $K(\Delta\hat{\tau})$ obtained in steps B, C and D and the selected secondary propagation path relative amplitude maximum $\alpha_c$;

Q. computing $\gamma_1$ and $\gamma_2$ according to $$\gamma_i = \frac{-Y + (-1)^i \sqrt{Y^2 - 4XZ}}{2X}; i = 1, 2$$

using the values of X, Y, and Z obtained in step P;

R. computing a, b, c and d for both $\gamma_1$ and $\gamma_2$ obtained in step Q using the equations of step E for a, b, c and d;

S. computing the estimation statistic $\Lambda$ for both sets of a, b, c and d obtained in step R using the equation of $\Lambda$ of step F;

T. selecting the larger of the values of $\Lambda$ obtained in step S; and

U. assigning the selected larger value of $\Lambda$ of step T to the selected point of step A.

9. The process of claims 7 or 8 further comprising the steps of:

V. repeating the steps of claims 7 or 8 for a plurality of points in the $\hat{\tau}$, $\Delta\hat{\tau}$ plane surrounding the point of step A; and W. determining that the estimation statistic of the surrounding points are not greater than the estimation statistic at the points of step A.

10. A reduced computation method for forming cross-correlations $R(\hat{\tau})$ and $R(\hat{\tau}+\Delta\hat{\tau})$ used in signal processing applications wherein signal modulation m(t) contains recurrent information, the method, comprising the steps of:

AA. sampling the received signal frequency translated to baseband synchronously with a replica signal modulation waveform brought into approximate time registration with the received signal modulation;

BB. selecting signal samples spanning the signal modulation containing the recurrent information;

CC. converting differing polarity samples of the signal modulation to a common polarity reference;

DD. combining corresponding polarity converted samples spanning the signal modulation containing the recurrent information;

EE. using the reduced dimensional set of combined signal samples to form the cross-correlations $R(\hat{\tau})$ and $R(\hat{\tau}+\Delta\hat{\tau})$.

11. A process for optimally estimating the direct path propagation delay of a received signal when also receiving one or more secondary propagation path signals, the process comprising the steps:

transforming the signal parameter related functions $\hat{A} \cos(\hat{\theta})$, $\hat{A} \hat{\alpha} \sin(\hat{\theta}+\hat{\phi})$, where $\hat{A}$ represents direct path signals amplitude estimate, $\hat{\theta}$ represents direct path carrier phase estimate, $\hat{\alpha}$ represents secondary path signal relative amplitude estimate, and $\hat{\phi}$ represents secondary path relative carrier phase estimate, to a set of parameters a, b, c, and d having solutions in a system of linear equations, where a, b, c, and d are invertible to signal related parameters A, $\theta$, $\alpha$ and $\phi$; and performing a maximum search in two dimensions of signal delay parameters.

* * * * *

UNITED STATES PATENT AND TRADEMARK OFFICE
CERTIFICATE OF CORRECTION

PATENT NO. : 6,370,207 B1
DATED : April 9, 2002
INVENTOR(S) : Lawrence Weill and Benjamin Fisher It is certified that error appears in the above-identified patent and that said Letters Patent is hereby corrected as shown below:

Drawings,
Fig. 6 of sheet 6, delete "0.2" and insert -- 0.25 --.
Fig. 6 of sheet 6, delete "1.7" and insert -- 0.75 --.
Fig. 6 of sheet 6, delete "1.2" and insert -- 1.25 --.
Equation (2), delete "((" and insert -- ( --.
Equation (3), delete "$\bar{n}_I$" and insert -- $\bar{n}_I(t)$ --.

Column 4,
Line 66, delete " , $\widetilde{r}(t)$ " and insert -- , $\widetilde{r}(t)$ , --.

Equation (5), delete " $p_{f|\hat{\lambda},\hat{\vartheta},\hat{\tau}}$ " and insert -- $p_{\tilde{r}|\hat{\lambda},\hat{\vartheta},\hat{\tau}}$ --.

Equations (5) and (6), delete " $\cos\vartheta$ " and insert -- $\cos\hat{\vartheta}$ --.

Column 5,
Line 26, delete "NE" and insert -- ML --.
Line 31, delete "extrenal" and insert -- extremal --.
Line 32, delete "external" and insert -- extremum --.
Equation (12), delete " $\hat{A}e^{j\hat{\varphi}}$ " and insert -- $\hat{A}e^{j\hat{\vartheta}}$ --.

Column 6,
Line 63, delete " $\hat{\Delta\tau}$ " and insert -- $\widehat{\Delta\tau}$ --.
Line 67, delete "maxima" and insert -- maximum --.

Delete equation (10), and insert -- $\Lambda = \dfrac{2\hat{A}}{No}\left|\int_{t_0}^{t_0+T}\widetilde{r}(t)m(t-\hat{\tau})dt\right|$ --.

Equation (7), delete " $\sin\vartheta$ " and insert -- $\sin\hat{\vartheta}$ --.

Equation (12), delete " $p_j|\hat{A},\hat{\vartheta},\hat{\tau},\hat{a},\hat{\varphi},\hat{\Delta\tau}$ " and insert -- $p_{\tilde{r}|\hat{\lambda},\hat{\vartheta},\hat{\tau},\hat{a},\hat{\varphi},\widehat{\Delta\tau}}$ --.

Equation (12), delete " $m(t-\hat{\tau}-\Delta\tau)$ " and insert -- $m(t-\hat{\tau}-\widehat{\Delta\tau})$ --.

Delete equation (13), and insert -- $\Lambda = \dfrac{\left|\int_{t_0}^{t_0+T}\widetilde{r}(t)[m(t-\hat{\tau})+\hat{a}e^{j\hat{\varphi}}m(t-\hat{\tau}-\widehat{\Delta\tau})]dt\right|^2}{\int_{t_0}^{t_0+T}\left|m(t-\hat{\tau})+\hat{a}e^{j\hat{\varphi}}m(t-\hat{\tau}-\widehat{\Delta\tau})\right|^2 dt}$ --.

Delete equation (16) and insert -- $\Lambda = 2\,\text{Re}[(a-jc)R(\hat{\tau})]+2\,\text{Re}[(b-jd)R(\hat{\tau}+\widehat{\Delta\tau})] - 2(ab+cd)K(\widehat{\Delta\tau})-(a^2+b^2+c^2+d^2)K(0)$ --.

Column 7,
Line 15, delete " $\Delta\hat{\tau}$ " and insert -- $\widehat{\Delta\tau}$ --

UNITED STATES PATENT AND TRADEMARK OFFICE
CERTIFICATE OF CORRECTION

PATENT NO. : 6,370,207 B1
DATED : April 9, 2002
INVENTOR(S) : Lawrence Weill and Benjamin Fisher It is certified that error appears in the above-identified patent and that said Letters Patent is hereby corrected as shown below:

Column 8,
Line 20, delete "$\gamma_i^2$".
Line 47, delete "$\hat{\alpha}_c^2$" and insert -- $\alpha_c^2$ --.
Line 56, delete "$-\alpha_c^2|K(0)R(\hat{\tau}) - K(\hat{\Delta}\tau) - K(\hat{\Delta}\tau)R(\hat{\tau}+\hat{\Delta}\tau)|^2$", and insert -- $-\alpha_c^2|K(0)R(\hat{\tau}) - K(\widehat{\Delta\tau})R(\hat{\tau}+\widehat{\Delta\tau})|^2$ --.

Column 9,
Lines 2, 3, 7, 9 and 13, delete "$\hat{\Delta}\tau$" and insert -- $\widehat{\Delta\tau}$ --

Lines 16 through 26, inclusive, delete entire paragraph.

Lines 4, 14 and 34, delete "$\hat{\Delta}\tau_{ML}$" and insert -- $\widehat{\Delta\tau}_{ML}$ --.

Lines 4 and 14, delete "$\hat{\tau}$" and insert -- $\tau$ --.
Lines 4 and 15, delete "$\hat{\Delta}\tau$" and insert -- $\Delta\tau$ --.

Delete equation (21) and insert -- $\hat{A}_{ML} = \sqrt{a^2 + c^2}$ --.

Delete equation (23) and insert -- $\hat{\vartheta}_{ML} = \dfrac{\sqrt{b^2 + d^2}}{\hat{A}_{ML}}$ --.

Column 10,
Line 10, delete "digital," and insert -- digital --.
Line 61, delete "receivers" and insert -- receiver's --.

Column 11,
Line 36, delete "Fig. 5" and insert -- Fig. 3 --.

Line 47, in 2 places, delete "$\Delta\hat{\tau}$" and insert -- $\widehat{\Delta\tau}$ --

Line 61, in 2 places delete "$\hat{\Delta}\tau$" and insert -- $\widehat{\Delta\tau}$ --

Lines 65 and 66, delete "$\Delta\hat{\tau}$" and insert -- $\widehat{\Delta\tau}$ --

UNITED STATES PATENT AND TRADEMARK OFFICE
CERTIFICATE OF CORRECTION

PATENT NO. : 6,370,207 B1
DATED : April 9, 2002
INVENTOR(S) : Lawrence Weill and Benjamin Fisher It is certified that error appears in the above-identified patent and that said Letters Patent is hereby corrected as shown below:

Column 12,
Line 12, in 2 places delete " $\overset{\wedge}{\Delta\tau}$ " and insert -- $\widehat{\Delta\tau}$ --
Lines 15, 42 and 45, delete " $\Delta\hat{\tau}$ " and insert -- $\widehat{\Delta\tau}$ --

Between lines 17 and 29 in 11 places delete " $\overset{\wedge}{\Delta\tau}$ " and insert -- $\widehat{\Delta\tau}$ --

Line 24, delete "$\Delta\tau$" and insert -- $\widehat{\Delta\tau}$ --
Line 41, delete "A" and insert -- $\Lambda$ --.
Line 42, delete "$\Lambda$" and insert -- A --.

Column 13,
Line 37, delete "a greater than ac" and insert -- $\hat{a}$ is greater that $a_c$ --.

Line 40, delete " $\alpha_c^4 |R(\hat{\tau}+\Delta\hat{\tau})|^2 \alpha_c^2 |R(\tau^2|^2$ " and insert $-\alpha_c^4|R(\hat{\tau}+\widehat{\Delta\tau})|^2 - \alpha_c^2|R(\hat{\tau})|^2$ --.

Line 48, delete "))" and insert -- ) --.
Line 48 and in equation (19) in 9 places delete " $\overset{\wedge}{\Delta\tau}$ " and insert -- $\widehat{\Delta\tau}$ --

Line 48 and between lines 40 and 47 in 7 places delete " $\Delta\hat{\tau}$ " and insert -- $\widehat{\Delta\tau}$ --

Column 14,
Lines 14, 21 and 40, delete " $\Delta\hat{\tau}$ " and insert -- $\widehat{\Delta\tau}$ --

Line 18, delete "points" and insert -- point --.

Signed and Sealed this

Twenty-fourth Day of December, 2002

JAMES E. ROGAN
*Director of the United States Patent and Trademark Office*